(12) United States Patent
Folkmanis et al.

(10) Patent No.: US 8,996,904 B1
(45) Date of Patent: Mar. 31, 2015

(54) MAINTAINING CLOCK SYNCHRONIZATION BETWEEN COMPUTING DEVICES

(75) Inventors: Girts Folkmanis, San Francisco, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/552,524

(22) Filed: Jul. 18, 2012

(51) Int. Cl.
G06F 1/10 (2006.01)
G06F 1/32 (2006.01)

(52) U.S. Cl.
CPC .............. G06F 1/10 (2013.01); G06F 1/3206 (2013.01); G06F 1/3237 (2013.01)
USPC ........................................................ 713/500

(58) Field of Classification Search
None
See application file for complete search history.

(56) References Cited

U.S. PATENT DOCUMENTS

| 8,056,818 | B2 | 11/2011 | Stewart et al. |
| 8,065,019 | B2 | 11/2011 | Marnfeldt et al. |
| 2002/0140547 | A1* | 10/2002 | Litwin et al. ............. 340/310.01 |
| 2003/0063525 | A1 | 4/2003 | Richardson et al. |
| 2007/0190964 | A1* | 8/2007 | Edwards et al. ........... 455/343.1 |
| 2008/0316870 | A1 | 12/2008 | Pikula et al. |
| 2010/0077188 | A1* | 3/2010 | Graham et al. ............... 712/244 |

* cited by examiner

*Primary Examiner* — Kim Huynh
*Assistant Examiner* — Vincent Chang
(74) *Attorney, Agent, or Firm* — Morris & Kamlay LLP

(57) ABSTRACT

In transferring data between a first computing device having a first clock generator component and a second computing device having a second clock generator component, timing information is generated by at least the first clock generator component and is shared over a communication channel with the second computing device to synchronize the first and second clock generator components. Upon detecting that power available to the first computing device has fallen below a designated threshold level, the first computing device enters a power loss mode. Upon entering the power loss mode, the first computing device selectively inactivates one or more designated components by a power module while continuing operation of at least the first clock generator component to maintain the synchronizing timing information associated with the second clock generator component.

21 Claims, 4 Drawing Sheets

MAINTAINING CLOCK SYNCHRONIZATION BETWEEN COMPUTING DEVICES

BACKGROUND

Computing devices have clock generator components which generate timing information that is used to coordinate the execution of functions within the device. Additionally, when a computing device communicates data with another computing device over a connection, the timing information is shared over the connection to synchronize the clock generator components of the two computing devices. Example methods in wireless communication are frequency hopping and time division channel multiplexing. If one or more of the clock generator circuits of the two communicating devices go out of synchronization, transfer of data fails to function properly.

In the event that the computing device experiences a power loss, the device may be configured to have reserve power. However, existing computing devices are designed to use the reserve power to operate the microcontroller and communications unit (such as a radio transceiver) during the power loss. This results in the stored power becoming exhausted in a relatively short amount of time. Once stored power is exhausted, the clock generator of the computing device will shut down, and the computing device will lose timing synchronization with any computing device(s) it was communicating with prior to the power loss. Accordingly, once power is restored, the computing device must reacquire the timing synchronization data. This is disadvantageous as reacquiring synchronization data takes a substantial amount of time.

What is needed is a system and method for maintaining clock synchronization between computing devices during a power loss by selectively shutting down/suspending non-essential components while maintaining operation of the clock generator component.

SUMMARY

In corresponding aspects, a system, method and non-transitory machine readable medium is described in accordance with the present disclosure. The present disclosure is directed to transferring data between a first computing device having a first clock generator component and a second computing device having a second clock generator component. Timing information is generated by at least the first clock generator component and is shared over a communication channel with the second computing device to synchronize the first and second clock generator components. Upon detecting that power available to the first computing device has fallen below a designated threshold level, the first computing device enters a power loss mode. Upon entering the power loss mode, the first computing device selectively inactivates one or more designated components by a power module while continuing operation of at least the first clock generator component to maintain the synchronizing timing information associated with the second clock generator component.

DETAILED DESCRIPTION

In general, the present disclosure is directed to a method executed in a system which monitors power supplied to a computing device that is transmitting and/or receiving data with one or more other computing device(s) over a wired and/or wireless connection. In the event of a power loss, a power module in the computing device selectively suspends or terminates one or more hardware and/or software components while the clock generator component of the computing device is kept powered and operational to maintain the clock signal. Once power is restored to the computing device, the system restarts and/or powers up the previously suspended/terminated components. Considering that the clock generator component remains operational during the power loss, the computing device is able to quickly resume data communications with the other computing device(s) 104 over the communications channel 106. The system is thus useful and advantageous in AC as well as battery powered devices to keep their clocks operating and thus synchronized during a power loss.

Figure 1:
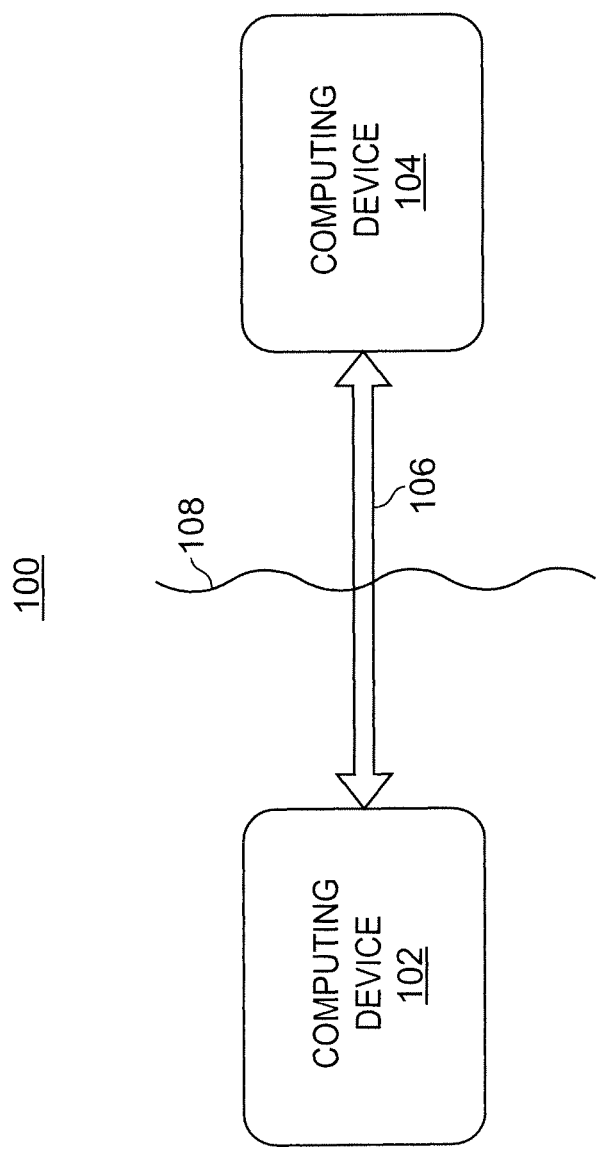
FIG. 1 illustrates a diagram of an example system environment in accordance with an aspect of the present disclosure.

FIG. 1 illustrates a diagram of an example system environment that implements a system, non-transitory machine readable medium and method for maintaining clock synchronization during a power loss in accordance with an aspect of the present disclosure. In particular, the example system environment 100 includes a plurality of computer devices 102, 104 which communicate data with one another over a connection 106. It should be noted that although two computer devices 102, 104 are shown in FIG. 1, any number of computer devices are contemplated.

The computer devices 102, 104 may be network enabled servers and/or one or more network enabled client devices configured to communicate over a wide area network and/or a local area network 108. It should be noted that FIG. 1 is only exemplary and that the environment 100 could include other numbers and types of devices in other arrangements.

Network 108 includes a publicly accessible network, such as the Internet, which handles communication between the computing devices 102, 104. Communications between computing devices 102, 104 can preferably take place over the network 108 according to standard network protocols, such as the HTTP, UDP, RADIUS and TCP/IP protocols and the like. Network 108 can also encompass cellular network systems which utilize cell sites and transmission towers that allow connections between the computing devices 102, 104 via gateway devices (not shown). Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between computing devices 102, 104. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), fiber optics, wireless links including satellite links and other communications links known to those skilled in the relevant arts.

In an aspect where one or more computing devices are servers, such servers can include one or more network devices or machines capable of providing one or more network services, such as Web-based and/or non Web-based applications via the network 108. In an aspect, one or more servers may implement a version of Microsoft® IIS servers, RADIUS servers and/or Apache® servers, although other types of servers may be used and other types of applications may be available on the servers. In an aspect, one or more computing devices 102, 104 may include a cluster of a plurality of servers which are managed by a network traffic management device (e.g. firewall, load balancer, web accelerator), gateway device, router, hub and the like.

In an aspect, one or more computing devices 102, 104 are network enabled client devices which communicate with other network enable devices over wired and/or wireless network 108. In an aspect, computing devices 102, 104 may be configured to run a Web browser or other Web-based and/or non Web-based software that provides a user interface for human users to interact with, request resources and/or information, and submit instructions over the network 108 to the one or more other computing devices. Non-limiting and non-exhausting examples of at least one computing device being a client device includes, but is not limited to, laptop(s), mobile/smart phone(s), desktop(s), tablet device(s), kiosks, global positioning systems (GPS), ATMs, televisions, smart DVD players, PDAs, pagers, sensors, video game consoles, media players, home appliances and home automation and any other electronic device having the capability of transferring and/or receiving data with another electronic device. In an aspect, the computing device may serve as a primary reference clock as used in telecommunication networks to synchronize timings of other devices in the network.

With regard to the communications between the computing devices 102, 104, data is shared over the communication connection or channel 106. The communications may be exchanged over a wired or wireless channel in which clock signals are sent and synchronized between the devices 102, 104 to ensure correct operation. Each computing device 102, 104 contains a clock generator component 208 (FIGS. 2A and 2B) which generates a clock signal that can synchronize and coordinate operations with its own components as well as the proper transfer of data between the computing devices 102, 104. In an aspect, the clock generator component 208 may include an oscillator 218 and a capacitor 220, although it is contemplated that the clock generator component 208 may include additional/different hardware components.

In an aspect, the data sent over the channel 106 is transmitted/received in a unidirectional manner, although it is contemplated that the data may be transmitted/received in a bidirectional manner. When a computing device transmits data packets to another computing device, the clock signal generated by the clock generator component 208 in the transmitting computing device is sent over the connection along with the transmitted data. The synchronization data associated with the clock signal may be sent as well, wherein the receiving computing device is able to process the synchronization data with its own clock generator component to properly handle the received data packets. In an aspect, the timing information can be explicit, such as a clock signal, although it is contemplated, in another aspect, that the timing information may be implicit in nature in that it is derived from a preamble, Manchester encoding and the like. The clock generator component 208 and synchronization methods are well known in the art and are not described in detail in the present disclosure.

Figure 2A:
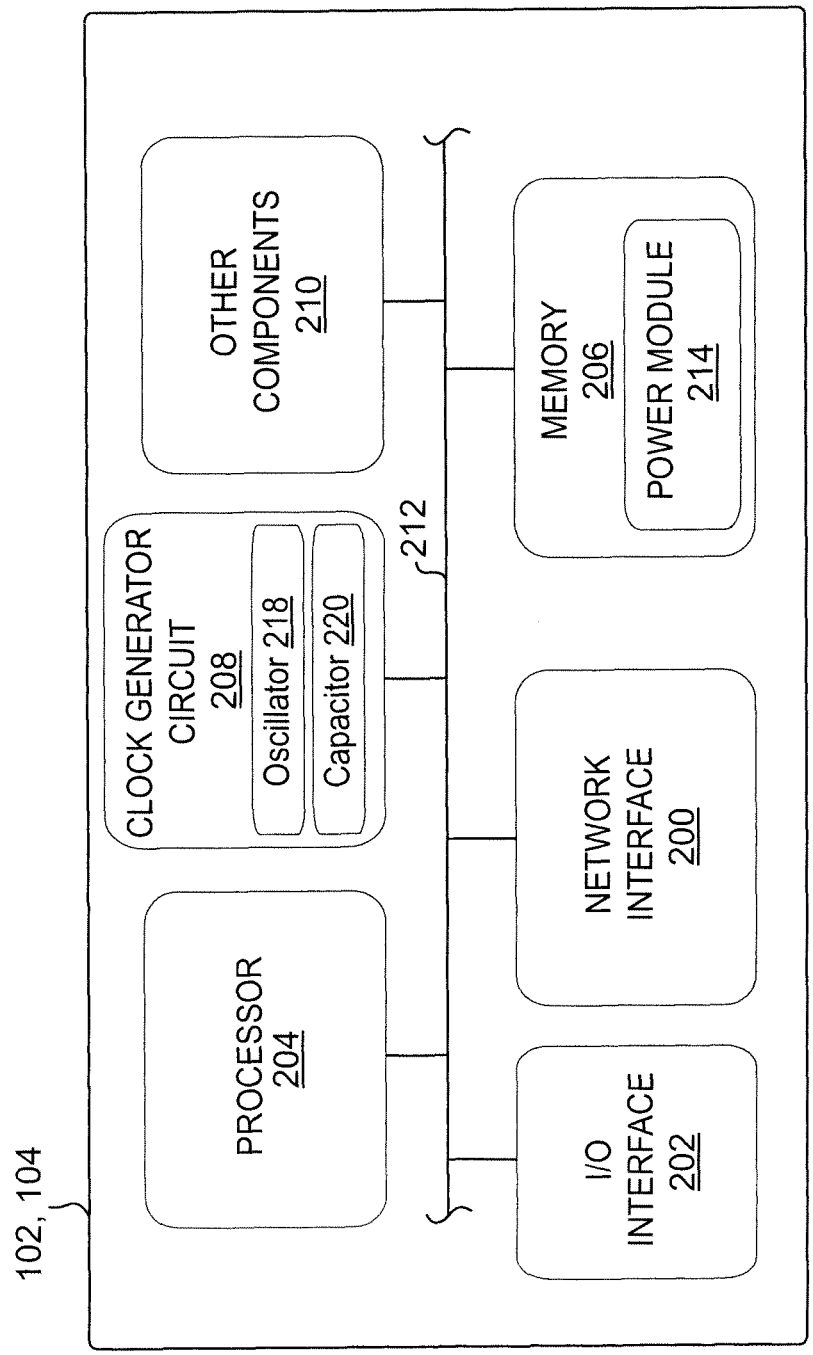
FIGS. 2A and 2B illustrate block diagrams of alternative computing devices implementing a power module in accordance with an aspect of the present disclosure.
Figure 2B:
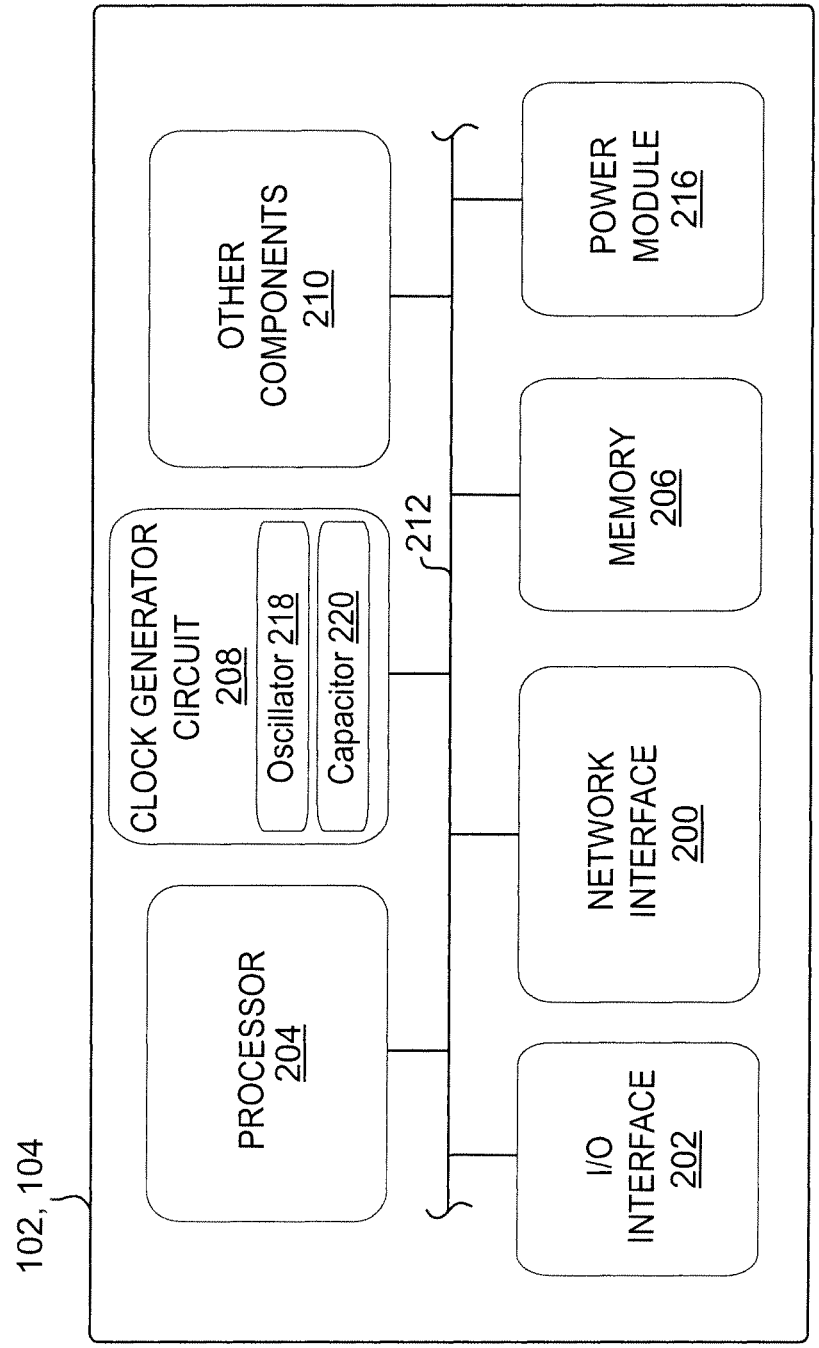

FIGS. 2A and 2B illustrate block diagrams of alternative computing devices implementing a power loss module in accordance with an aspect of the present disclosure. Referring to FIGS. 2A and 2B, the computing device 102, 104 includes a plurality of components such as one or more network interfaces 200, one or more device I/O interfaces 202, one or more device processors 204, one or more device memories 206, one or more clock generator components 208, other components 210, and a power module 214, 216, all of which are coupled together by one or more buses 212.

Network interface 200 includes one or more mechanisms that allow the computing device 102, 104 to communicate with one another and/or other computing devices via the network 108. Moreover, the network interface 200 may include certain physical ports dedicated to receiving and/or transmitting certain types of network data, such as device management related data for configuring the respective device, and the like. Further, the network interface 200 may include one or more physical ports, such as Ethernet ports, to couple its respective device with other computing devices in the system 100. In an aspect, the network interface 200 is an antenna component which allows communications with other computing devices in a wireless fashion. However, it is contemplated that the network interface 200 may be constructed for use with other communication protocols and types of networks. Network interface 200 is sometimes referred to as a transceiver, transceiving device, or network interface card (NIC), which transmits and receives, unidirectionally or bidirectionally, data packets over one or more networks 108.

Device I/O interface 202 includes one or more user input and output device interface mechanisms. The interface 202 may include a computer keyboard, touchpad, touchscreen, mouse, display device, and the corresponding physical ports and underlying supporting hardware and software to enable communications with other network enabled computing devices in the system 100. Such communications include, but are not limited to, accepting user data input and providing output information to a user, programming, accessing one or more memory devices and administering one or more functions to be executed by the corresponding device and the like. It should also be noted that one or more of the components illustrated in FIG. 2A or 2B may be optional and not necessary to implement of novel subject matter described herein. For instance, in an aspect, the computing device 102, 104 may operate as a repeater node in a network in which the computing device 102, 104 would provide clock and synchronization data to other network devices in a mesh network. In this example aspect, the repeater node computing device would not implement an I/O device interfaces 202 in accordance with the present disclosure.

Device processor 204 includes one or more microprocessors configured to execute computer/machine readable and executable instructions stored in the respective local device memory 206 or in a remote device memory. Such instructions are implemented by the processor(s) 204 to perform one or more functions described herein and in the flowchart shown in FIG. 3. It is understood that the processor 204 may include other types and/or combinations of processors, such as digital signal processors, micro-controllers, application specific integrated components ("ASICs"), programmable logic devices ("PLDs"), field programmable logic devices ("FPLDs"), field programmable gate arrays ("FPGAs"), and the like. In an example, the computing device 102, 104 includes more than one device processor 204 (or a processor 204 with more than one core), and each processor 204 (and/or core) may use the same single network interface 200 or a plurality of network interfaces 200 to communicate with other computing devices.

Device memory 206 includes non-transitory computer readable tangible storage media, namely machine readable or processor readable storage media, which are examples of machine-readable storage media. It should be noted that the computer readable storage media does not solely involve the transfer of signals between devices. Machine readable storage/machine-readable storage media may include volatile, nonvolatile, removable, and non-removable media implemented in any method or technology for storage of information. Such storage media stores machine readable/machine-executable instructions, data structures, program modules and components, or other data which may be obtained and/or executed by one or more processors, such as device processor 204. Examples of machine readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the components in the computing device 102, 104.

Figure 3:
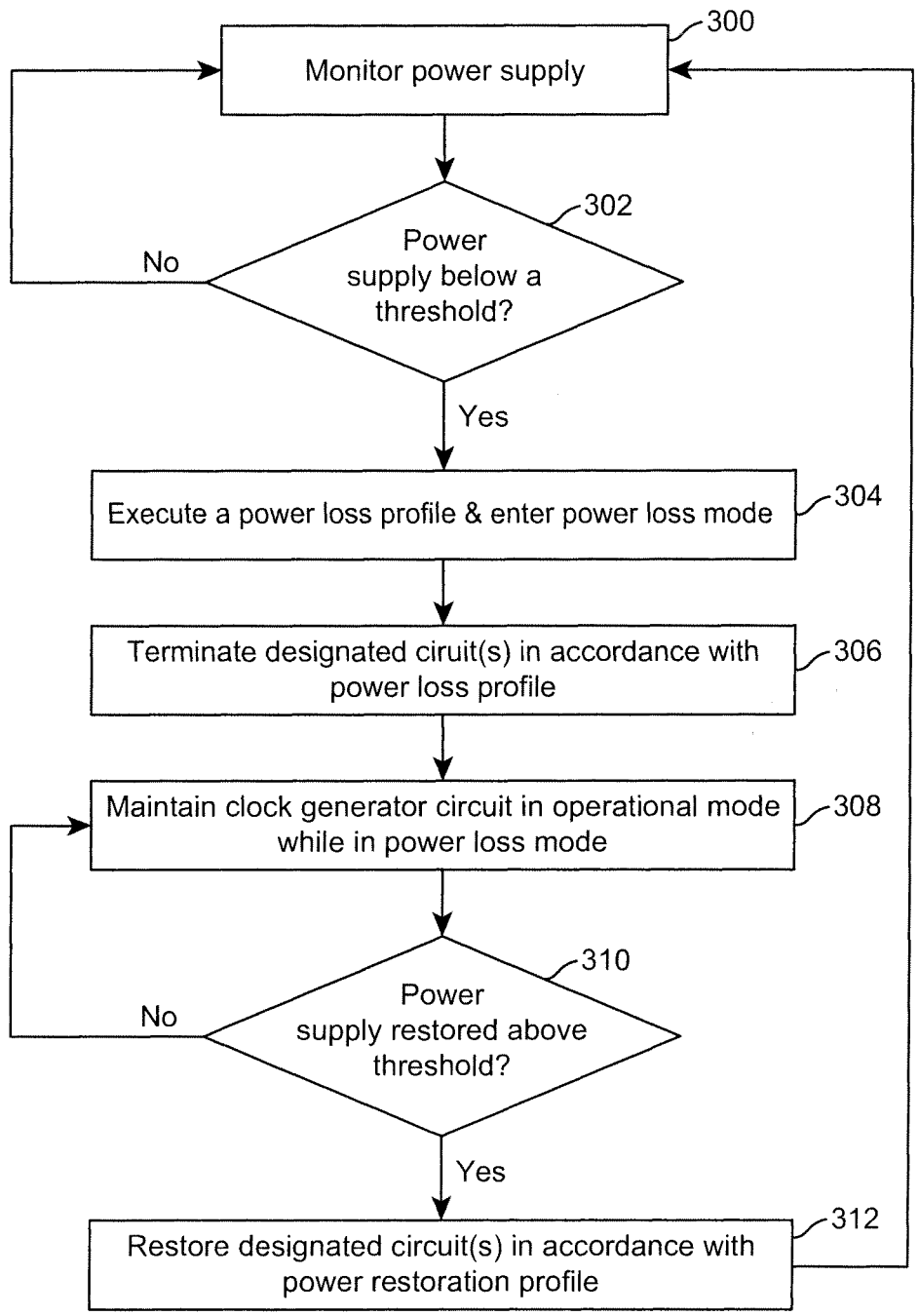
FIG. 3 illustrates a flow chart directed to a process of maintaining synchronization functions associated with a clock generating component during a power loss in accordance with an aspect of the present disclosure.

In an aspect, as shown in FIG. 2A, the power module 214 is a software-based component contained within the memory 206 or other storage device, whereby the power module 214 includes processor executable instructions which, when executed by the processor 204, cause the processor 204 to perform the power loss steps described in FIG. 3 in the event that a power loss is detected. In an aspect, the power module 214 may include processor executable instructions which cause the processor 204 to perform the power restoration steps described in FIG. 3 in the event that power is restored to the computing device 102, 104.

In another aspect, as shown in FIG. 2B, it is contemplated that the power module 216 may be a hardware logic-based component (e.g. FPGA, ASIC) that communicates with the processor 204 to power down/inactivate or power up/reactivate the components on the computing device 102, 104. In an example aspect, the power module 216 may be implemented on another hardware device (such as a co-processor) in which the power module 216 perform the functions described in FIG. 3 independent of the processor. In this example aspect, the hardware based power module 216 is capable of instructing the processor 204 to power down fully or partially during a power loss scenario.

As will be described in more detail below, the power module 214, 216 is configured to selectively suspend, terminate or otherwise power down one or more designated hardware and/or software components when the computing device 102, 104 has experienced a power loss. However the power module 214, 216 maintains operation of one or more components associated with clock generation and synchronization operations in the computing device 102, 104. The components which maintain operation while the computing device is in power loss mode may be the clock generator component 208, processor 204 and/or any other components essential to clock generation and synchronization operations.

As stated above, the computing device 102, 104 may contain one or more clock generator components 208. The clock generator component 208, as described above, generates a clock signal which is used by the computing device 102, 104 to coordinate internal operations and/or external operations. Example of external operations include, but are not limited to, the transmitting and receiving of data with other computing devices over a wired and/or wireless connection. The clock generator component 208 is configured to operate with the processor 204 and the network interface 200 to transmit synchronization data to one or more other external computing devices 102, 104. The transmitted synchronization data ensures that the internal clocks of the individual communication devices 102, 104 are synchronized with one another with respect to the transmission of data over the connection 106. In an aspect, as shown in FIG. 2B, the clock generator component 208 is shown as a component that is separate from the processor 204 and is capable of operating on its own without assistance from the processor 204 when the computing device 102, 104 is in the power loss mode. It is contemplated, however, that the processor 204 may itself be configured to contain and operate the clock generator component 208. In an aspect, the power module 214, 216 and the clock generator component are integrated on the same hardware/software component.

Other components 210 in the computing device 102, 104 are directed to the various software and/or hardware components which run or perform functions/services when the computing device is operating. Some examples of these other components 210 include, but are not limited to, I/O devices 202, accelerometer components, antenna components, audio-based components (e.g. speakers, microphones), calling or messaging capabilities, media download/upload components, software programs, camera/video components and the like. As discussed below, in the event of a power loss, the power module 214, 216 will typically terminate or power down several of the other components to reserve enough stored power to ensure operation of the clock generator component 208.

Bus 212 may include one or more internal device component communication buses, links, bridges and supporting components, such as bus controllers and/or arbiters. The bus enables the various components of the computing device 102, 104, such as the network interface 200, device I/O interface 202, processor 204, device memory 206, clock generator component 208, other components 210, and the power module 214, 216 to communicate with one another via bus 212. However, it is contemplated that the bus 212 may enable one or more components of the computing device 102, 104 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the computing device 102, 104 which houses the bus 212.

In general, the present disclosure is directed to a system, machine readable medium, and method in which the computing device transmits, receives or otherwise shares data with one or more other computing device(s) 104 over a wired and/or wireless connection. One or more components in the computing device monitors the amount of power available to the computing device and performs certain functions in the event that the available power crosses a designated threshold power level.

In the event that it is determined that the power available to the computing device 102 falls below a designated threshold power level, preferably in terms of voltage, the power module 214, 216 instructs the device 102 to enter a power loss mode. Upon entering the power loss mode, the computing device 102 selectively suspends, terminates, or otherwise inactivates one or more hardware and/or software components that are designated as non-essential to time-keeping functions (e.g. clock generation, synchronization) of the device 102. Accordingly, at least the clock generator component of the computing device 102 is kept powered and operational to maintain the clock signal and synchronization data while the computing device is in the power loss mode. It is contemplated that components other than the clock generator component 208 may be kept fully or partially powered while the computing device 102 is in the power loss mode (e.g. processor 204, network interface 200) as designated by the power module 214, 216.

Once the computing device 102 detects that the available power to the computing device increases past a designated power level, the power module 214, 216 instructs the device 102 to enter operational mode. Upon entering the operational mode, the computing device 102 restarts, powers up or otherwise activates the previously suspended/terminated components. Considering that the clock generator component 208 (and any other designated components) had remained operational during the power loss, the computing device 102 is able to quickly resume data communications with the other computing device(s) 104 over the communications channel 106. The system is thus useful and advantageous in AC-powered devices as well as battery powered devices to keep timings of the computing device's 102 clock synchronized with the other computing device's 104 clocks while the batteries are changed or fall below some predetermined voltage threshold.

FIG. 3 illustrates a flow chart directed to a process of maintaining synchronization functions associated with a clock generating component during in accordance with an aspect of the present disclosure. As shown in FIG. 3, power supplied to or remaining within the computing device 102 is monitored while the computing device is in the operating mode (Block 300). In an aspect, the power module 214, 216 (or other monitoring component) of the computing device 102 continually or periodically monitors whether power supplied to or remaining in the computing device 102 falls below a set threshold level (Block 302). The set threshold level may be set by a hardware or software developer, device manufacturer or owner of the computing device 102. The threshold level may be based on current, voltage, combination thereof or other factor(s).

In an aspect, the computing device 102, when in the operating mode, operates one or more components, including the clock generator component 208, whereby the clock generator component 208 provides clock data and synchronization data to other components within the computing device and/or to one or more other computing devices over a connection in which data is transmitted/received.

Referring back to FIG. 3, Block 302 indicates the step where the computing device 102 determines if the supplied/available power to the device 102 has fallen below a designated threshold. In an aspect, the available power is monitored using an input pin of the processor 204 or power module 214, 216, in which the input pin is capable of asserting an interrupt or other signal when the available power is below the threshold level. This signal causes the computing device 102 to enter the power loss mode as soon as the signal is generated. If it is determined that the available power to the computing device 102 has not fallen below the threshold voltage, the process repeats back to Block 300. In contrast, if the power module 214, 216 (or other component) determines that the available power has fallen below the set threshold level, the power module 214, 216 causes the computing device to enter the power loss mode and executes instructions to inactivate one or more non timing-related components of the computing device 102 (Block 304).

In particular to an aspect, the power module 214, 216 causes the processor 204 or other its own hardware device 216 to suspend, terminate or otherwise inactivate one or more hardware and/or software components (Block 306).

In an aspect, the components that are to be powered down are designated in software and/or hardware instructions which the power module 214, 216 executes when the device 102 is in the power loss mode. The designated components may be the network interface 200, the I/O interface 202, the processor 204, memory 206 and/or one or more of the other components 210. In an aspect, all of the designated components are inactivated by the power module 214, 216 all at once when the device 102 enters the power loss mode. In another aspect, individual or groups of certain components are inactivated in a specified order when the device 102 enters the power loss mode. The order in which components are shut down may be based on the relative power consumption of the components, relative importance of the particular component(s) operation to the overall functionality of the device itself, and the like.

In an aspect, the power module 214, 216, while in the power loss mode, will maintain operation of the clock generator component 208 and any other components associated with timing data while the other components are inactivated (Block 308). Since the clock generator component 208 remains powered and operational, the computing device can keep the clock synchronized for a significantly longer period than if other components had to also be powered. It is also contemplated that the power module 214, 216 may require that the processor 204 itself at least partially power down to a designated operational level to allow it to maintain operation of the clock generator component 208 to conserve more reserve power. In an aspect, the processor 204 may be instructed to completely power down, whereby the power module 216 and clock generator component 208 remains in the operational mode during the power loss.

As shown in FIG. 3, the processor 204 or component 216 continues to monitor the available power and whether it is restored to the computing device (Block 310). If not, the computing device remains in the power loss mode and the clock generator component 208 remains in the operational state (Block 308).

However, once the processor 204 or other component determines that power is restored or otherwise becomes available to the computing device 102, the power module 214, 216 causes the computing device 102 to resume, power up or otherwise activate the previously suspended/shut down hardware/software components (Block 312). It should be noted, however that since the clock generator component 208 (and any essential time-keeping components) was still operational while the computing device 102 was in the power loss mode, the computing device 102 can resume communications with the computing device 104 without the need to perform resynchronization functions.

In an aspect, the power module 214, 216 may instruct the computing device 102 to restore operations of the identified components all at once or in a sequential order.

While embodiments and aspects have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method comprising:
    transferring data from a first computing device having a first clock generator component to a second computing device having a second clock generator component, wherein timing information about a signal generated by the first clock generator component is shared over a communication channel with the second computing device to synchronize the first clock generator component with the second clock generator component;
    detecting, at the first computing device, that power available to the first computing device while in an operational mode is below a designated threshold level;
    entering a power loss mode at the first computing device, wherein the first computing device selectively inactivates one or more designated components of the first computing device including at least one component configured to provide connectivity to the communication channel while continuing operation of at least the first clock generator component to maintain the same synchronizing timing information in the operational mode as in the power loss mode, wherein the synchronization between the first and second computing devices is such that there are no resynchronization operations performed as the first computing device shifts from the power loss mode to the operational mode; and
    resuming transfer of data with the second computing device using the synchronizing timing information maintained by the first clock generator component when in the operational mode.

2. The method of claim 1, further comprising:
    detecting, at the first computing device, that the power available to the first computing device is above the designated threshold level; and
    entering the first computing device into an operational mode, wherein the first computing device activates the one or more previously inactivated components when in the operational mode.

3. The method of claim 1, wherein the one or more inactivated components are designated as non-essential to the timing information generated by the first clock generator component.

4. The method of claim 3, wherein the signal comprises a frequency and the timing information comprises an indication of the frequency.

5. The method of claim 1, wherein the first computing device inactivates at least two components in a designated order.

6. The method of claim 1, wherein the first clock generator component further comprises a capacitor and an oscillator.

7. The method of claim 1, wherein at least a hardware component of the first computing device is configured to generate an interrupt signal upon detecting that the available power has crossed the designated threshold level.

8. A non-transitory machine readable storage medium having stored thereon instructions for performing a process, comprising machine executable code which, when executed by a machine on a first computing device, causes the machine to:
    transfer data from the first computing device, the first computing device having a first clock generator component to a second computing device having a second clock generator component, wherein timing information about a signal generated by the first clock generator component is shared over a communication channel with the second computing device to synchronize the first clock generator component with the second clock generator component;
    detect that power available to the first computing device while in an operational mode is below a designated threshold level; and
    enter a power loss mode at the first computing device, wherein the first computing device selectively inactivates one or more designated components of the first computing device including at least one component configured to provide connectivity to the communication channel while continuing operation of at least the first clock generator component to maintain the same synchronizing timing information in the operational mode as in the power loss mode,
    wherein the synchronization between the first and second computing devices is such that there are no resynchronization operations performed as the first computing device shifts from the power loss mode to the operational mode, and
    wherein the machine of the first computing device is further configured to resume transfer of data with the second computing device using the synchronized timing information maintained by the first clock generator component when in the operational mode.

9. The machine readable medium of claim 8, wherein the machine of the first computing device is further configured to
    detect that the power available to the first computing device is above the designated threshold level; and
    enter the first computing device into an operational mode, wherein the first computing device activates the one or more previously inactivated components when in the operational mode.

10. The machine readable medium of claim 8, wherein the one or more inactivated components are designated as non-essential to the timing information generated by the first clock generator component.

11. The machine readable medium of claim 10, wherein the signal comprises a frequency and the timing information comprises an indication of the frequency.

12. The machine readable medium of claim 8, wherein the first computing device inactivates at least two components in a designated order.

13. The machine readable medium of claim 8, wherein the first clock generator component further comprises a capacitor and an oscillator.

14. The machine readable medium of claim 8, wherein at least a hardware component of the first computing device is configured to generate an interrupt signal upon detecting that the available power has crossed the designated threshold level.

15. A first computing device, the first computing device comprising:
    a network interface configured to allow communications with a second computing device over a communication channel;
    a first clock generator component configured to generate and share using the communication channel timing information about a signal generated by the first clock generator component to allow synchronization with a second clock generator component of the second computing device; and
    a power module configured to cause the first computing device to enter a power loss mode in response to detected available power to the first computing device falling below a designated threshold level while the first computing device is in an operational mode, wherein the power module further causes the first computing device to selectively inactivate one or more components including at least the network interface while continuing operation of the first clock generator component to maintain the same synchronizing timing information in the operational mode as in the power loss mode, wherein the synchronization between the first and second computing devices is such that there are no resynchronization operations performed as the first computing device shifts from the power loss mode to the operational mode, and wherein the first computing device is further configured to resume transfer of data with the second computing device using the synchronized timing information maintained by the first clock generator component when in the operational mode.

16. The first computing device of claim 15, wherein the first computing device is further configured to:
   detect that the power available to the first computing device is above the designated threshold level; and
   enter into an operational mode, wherein the first computing device resumes operation of the one or more previously inactivated components when in the operational mode.

17. The first computing device of claim 15, wherein the one or more inactivated components are designated as non-essential to the timing information generated by the first clock generator component.

18. The first computing device of claim 17, wherein the signal comprises a frequency and the timing information comprises an indication of the frequency.

19. The first computing device of claim 15, wherein the first computing device inactivates at least two components in a designated order.

20. The first computing device of claim 15, wherein the first clock generator component further comprises a capacitor and an oscillator.

21. The first computing device of claim 15, wherein the first computing device is configured to generate an interrupt signal upon detecting that the available power has crossed the designated threshold level.

* * * * *